United States Patent
Edvardsson et al.

(10) Patent No.: US 6,950,055 B2
(45) Date of Patent: Sep. 27, 2005

(54) METHOD AND AN APPARATUS FOR INSULATION OF A RADAR LEVEL GAUGE

(75) Inventors: Kurt Olov Edvardsson, Linköping (SE); Anders Jirskog, Huskvarna (SE); Magnus Ohlsson, Norsholm (SE)

(73) Assignee: Saab Rosemount Tank Radar AB, Gotebrog (SE)

( * ) Notice: Subject to any disclaimer, the term of this patent is extended or adjusted under 35 U.S.C. 154(b) by 0 days.

(21) Appl. No.: 10/687,975

(22) Filed: Oct. 20, 2003

(65) Prior Publication Data

US 2005/0083229 A1 Apr. 21, 2005

(51) Int. Cl.$^7$ .................. G01S 13/08; G01F 23/284
(52) U.S. Cl. ................. 342/124; 342/118; 342/175; 73/290 R
(58) Field of Search .................. 342/118–124, 175; 73/290 R, 291–303, 304 R, 304 C, 305–322, 322.5, 323–334, 290 B, 290 V; 324/629, 637–646, 95, 96; 343/767–780, 781 R, 782, 781 P, 781 CA, 783–786, 825–829, 833–842, 845–851, 872–873, 907–910, 911 R, 911 L, 912–916, 700 MS (56) References Cited

U.S. PATENT DOCUMENTS

| | | | | |
|---|---|---|---|---|
| 5,872,494 A | * | 2/1999 | Palan et al. | 342/124 |
| 5,877,663 A | * | 3/1999 | Palan et al. | 73/290 V |
| 6,320,532 B1 | * | 11/2001 | Diede | 342/124 |
| 6,401,532 B2 | | 6/2002 | Lubbers | |
| 6,750,808 B2 | * | 6/2004 | Faust | 342/124 |

FOREIGN PATENT DOCUMENTS

EP  0 762 089 A2  3/1997

OTHER PUBLICATIONS

"Patent Cooperation Treat PCT International Search Report" for PCT/SE2004/001510.

* cited by examiner

Primary Examiner—Bernarr E. Gregory
(74) Attorney, Agent, or Firm—Westman, Champlin & Kelly, P.A.

(57) ABSTRACT

There is provided a radar level gauge using microwaves for measuring a level of a surface of a product in a tank, comprising an antenna for transmitting microwaves to the surface and receiving microwaves reflected by the surface, a measurement circuitry feeding said antenna through a hollow wave guide and said wave guide including at least an antenna wave guide member, at one end couplable to the antenna and at its other end having an opening in an intersection across the wave guide, wherein the radar level gauge further comprises: a dielectric barrier extending along said intersection across the opening of said antenna wave guide member for non-conductively separating said antenna wave guide member from the measurement circuitry, said dielectric barrier having a first side facing the wave guide in a direction towards the antenna wave guide member and said dielectric barrier having a second side facing a direction substantially away from said antenna wave guide member.

25 Claims, 6 Drawing Sheets

Prior art

METHOD AND AN APPARATUS FOR INSULATION OF A RADAR LEVEL GAUGE

TECHNICAL FIELD

The present invention relates to level measurement in industrial processes, wherein the invention is used for the measurement of a level of a product in a storage tank of the type used in industrial applications and where the level measurement is performed by use of a microwave level gauge. More specifically, the invention relates to the connection of the electronics of a radar level gauge to an antenna mounted at a wall of the tank. The radar level gauge cabling and its connection to ground are regulated by different installation rules and by reasons of security. Insulation of conductors going into hazardous areas (where inflammable compounds are stored) is a related issue. A way of insulation to ground and items in the tank well suited for maintaining good function of radar sensors is the main object of the invention.

BACKGROUND

Oil refineries, chemical plants etc are examples of places where electrical control equipment such as various sensors and displays are installed over wide areas including a lot of cabling. Grounding and insulation are critical concepts for such installations and thus a lot of rules as well as solid physical constraints exist. Further, the rules may differ between different countries.

"Grounding" is a very treacherous concept as it sounds far more easy than it is as applied on installation over long ranges or working at frequencies which are "high" as compared to the frequency corresponding to a wavelength equal to the range (100 kHz corresponds to one or a few km etc.). Three areas must be considered (together with functional requirements):

Physical facts tell that local grounding points spread over a large area (such as tens of meters to kilometers) will have different potential both for DC and AC (mainly 50/60 Hz) and that cables between such points will form possibly good (but unintended) antennas for various electromagnetic fields. In static conditions, levels above 1 volt are seldom experienced, but even so currents far above 1 mA can be measured if two separated "grounded points" should be connected by a typical cable. For transients far higher voltages can be experienced for instance at a lightening strike (many times being lethal for poor cows due to voltage transients between their four grounding posts).

Installation regulations (by law or by company rules) are not uniform in all countries and probably not optimal for all different situations. Protection of persons may be the most important goal, but undisturbed transmission of very weak signals may require other means. In some cases different solutions for a certain type of unit are required in different countries to follow the local rules and to get good function. For circuits, connected to mains, 1500 VAC rated voltage (1500 VAC test voltage between "hot" lines and ground) is a common requirement and in many cases minimum distances are specified between "hot" conductors as well as minimum thickness of insulation layers. Grounding of cable screens is different from grounding of circuits and can also be regulated.

Ex-regulations (Ex. abbreviation of: Regulations for Explosions Safety) have grounding requirements and also requirements for insulation to conductors, which are located in areas corresponding to "zone 0" which typically is inside a tank. Ex-regulations are many times not quite clearly formulated when it comes to practical cases but may in some respects appear as subject to negotiations. Insulation to ground for intrinsically safe circuits is in many cases specified as 500 V AC rated voltage, while insulation to parts in zone 0 (inside the tank) is more complicated. Typically one infallible or three good insulation components are to be used in the last case with some more or less obvious requirements for the good ones.

The practical implementation for the grounding under different requirements is that the electronics shall be made to be well insulated from the local ground and then if required be connected in a suitable way different in different cases. For units using DC or very low frequencies (resistive temperature sensors, electro-mechanical level switches etc.) the galvanic concept "grounding" may be adequate, but due to capacitance in the cabling (in the order of 100 nF/km) all but very low frequency signals will have a rather complicated coupling to ground, the result of which is not always easy to predict.

For radar systems the situation is still more different as compared to units operating at low frequencies only. Many microwave (radar) circuits by themselves are locally grounded and to avoid disturbances, to enter (or escape from) these circuits, closed metallic enclosures are desired. "Locally grounded" means a fraction of a wavelength, which for radar frequencies is in the order of a single mm and "closed" for the radar frequencies means holes or slots smaller than a fraction of a wavelength. On the other hand the radar antenna has to be installed inside the tank. The combination of "good local connection to ground" and "good insulation from ground and from the interior of the tank" and "good transmission into the tank" makes a radar unit rather special with regard to the design of the insulation. Various solutions are in use and the fact that a physically small capacitance can have good microwave transmission properties is sometimes used.

One way to obtain insulation as seen from the field cabling is to use an AC power supply and an AC data transmission where transformers can be used for providing the gauge with both power and data communication but maintaining good DC insulation. The microwave circuit in that case can be locally grounded, or whatever, while maintaining good external insulation. In most cases for instruments in the process industry a system based on 4–20 mA DC data transmission is used and the corresponding insulation is more complicated or may degrade the accuracy. Sensors, which by their nature work, while they are enclosed in metal (temperature sensor, pressure sensor and other) may have an internal (and thus well protected) electrical insulation common for all components in the electronic unit.

Figure 1:
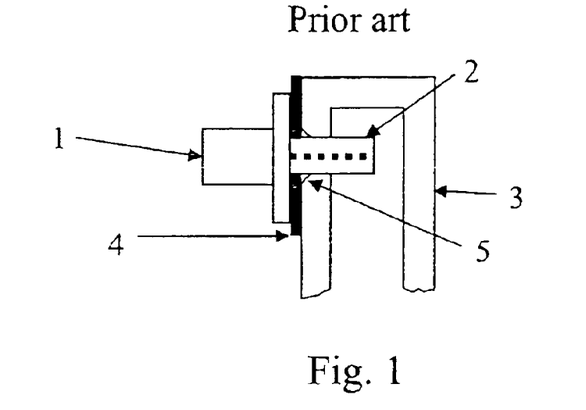
FIG. 1 shows a feeding of a wave guide of a radar level gauge in a prior art applicstion.

In cases with high frequency signals entering the tank, the local signal grounding is less easy to use. An insulation on the high frequency side is then an alternative. One practical example of insulation to a wave guide according to prior art is shown in FIG. 1. A standard SMA-coaxial connector 1 is used as a feeding probe 2 in a wave guide 3 at for instance 10 GHz. A dielectric washer 4 under the connector forms a capacitor and by a conical recess 5 the distance between the metal parts is increased to withstand applicable test voltage (such as 500 VAC or 1500 VAC). The washer 4 must be thin to limit VSWR (Voltage Standing Wave Ratio) and due to the limited capacitance this solution is best for medium or high microwave frequencies (>5 GHz). A washer too thick as compared to the wavelength may create microwave matching problem and this especially at a frequency like 25 GHz (wavelength 8 mm).

On a printed circuit board (or corresponding ceramic carrier) an insulated coaxial connector can be located and insulated by capacitors as components. Tripled capacitors can be used to fulfil intrinsically safety requirements for DC Insulation while maintaining microwave coupling for frequencies in the lower microwave range.

In any of the cases a robust insulation, fulfilling a specified thickness of the dielectric layer like 0.5 mm, is hard to fulfil. Capacitors rated for high voltages are, due to their big size, difficult to combine with good microwave function.

SUMMARY OF THE INVENTION

According to one aspect of the present invention there is provided a radar level gauge using microwaves for measuring a level of a surface of a product in a tank, comprising an antenna for transmitting microwaves to the surface and receiving microwaves reflected by the surface, a measurement circuitry feeding said antenna through a hollow wave guide and said wave guide including at least an antenna wave guide member, at one end couplable to the antenna and at its other end having an opening in an intersection across the wave guide, wherein the radar level gauge further comprises: a dielectric barrier extending along said intersection across the opening of said antenna wave guide member for non-conductively separating said antenna wave guide member from said measurement circuitry, said dielectric barrier having a first side facing the wave guide in a direction towards the antenna wave guide member and said dielectric barrier having a second side facing a direction substantially away from said antenna wave guide member. The intersection of the antenna waveguide member is preferably included in an intersectional plane.

The invention relates to a radar level gauge, where a wave guide is used for the antenna feeding and more specific systems where the wave guide from a certain point must be non-conductively separated from the electronic and microwave circuits, such as a measurement circuitry, of the radar level gauge with a dielectric material of a predetermined thickness (such as 0.5 mm) or of a predetermined dielectric strength. Preferably this non-conductive separation is done close to the measurement circuitry of the radar level gauge.

Another important and advantageous implementation is the location of the dielectric barrier at a wave guide joint enabling the measurement circuitry to be removed for exchange etc. The wave guide joint is robust as compared to a corresponding coaxial sealing, well suited for field service and easier to fit with an insulating dielectric barrier according to the invention.

The word "wave guide" is used here for an essentially cylindrical (in the broadest meaning of the term cylinder) pipe for microwave transmission, where the wave guide is filled with air or a solid dielectric material, which may be different along the wave guide. The cross section of the wave guide can be different, such as circular, rectangular or other with a ridged rectangular cross section as one of well-known examples of more complicated cross sections. Generally the term hollow wave guide is used to distinguish the described wave guides from other wave guide structures.

The term non-conductive is used in the meaning that two conductive materials are separated and insulated from each other in respect of DC current and low frequency AC currents, at least for a predetermined AC rated voltage. This is closely related to prescribed test voltages in electrical installations (such as 1500 VAC to ground) or in Ex-rules (such as 500 VAC to ground).

A joint is a practical and important detail in the wave guide, which is a special detail for the level gauging application. In most cases one part of the wave guide is a part of the tank sealing, which is critical at high pressure, corrosive or dangerous material in the tank etc. It is also necessary to be able to exchange electronic units of the radar level gauge easily under field conditions, whereby a separable joint is advantageous.

According to a further aspect of the invention there is also disclosed a method for non-conductively separating a wave guide couplable to an antenna from a measurement circuitry of a radar level gauge for measuring the level of a surface of a product in a tank as related in the independent method claim.

Further aspects of the invention are disclosed in the dependent claims.

EMBODIMENTS OF THE INVENTION

A number of embodiments of the present invention will be described in the following with support and reference to the enclosed drawings.

Figure 2:
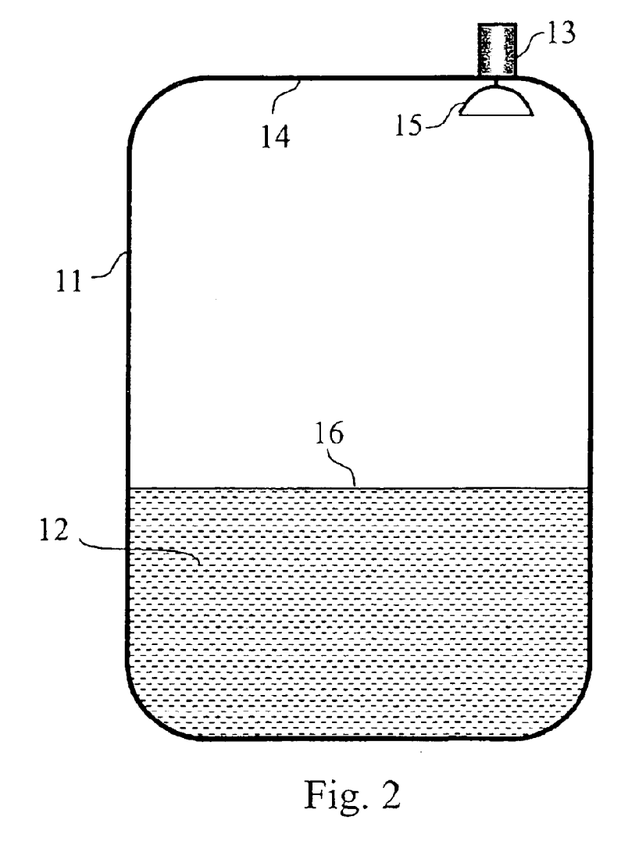
FIG. 2 schematically shows an example of a radar level gauging system for determining the level of the surface of a product in a tank.

An application of a radar level gauge is shown in FIG. 2. A tank 11 is used for storing a product 12. The product may be such as oil, refined products, chemicals and liquid gas, or may be a material in powder form. A radar 13 is attached to the roof 14 of the tank 11. A microwave beam is transmitted from the radar via an antenna 15 at the interior of the tank. The transmitted beam is reflected from the surface 16 of the product and is received by the antenna 15. By means of a comparison and evaluating of the time lap between transmitted and reflected beam in a measuring and controlling unit, a determination of the level of the product surface 16 is performed in a known manner. The microwave may be transmitted from the antenna as a free radiated beam or via a wave guide (not shown), which communicates with the product. The radar level gauge as shown in FIG. 2 is only used as one example.

Figure 3:
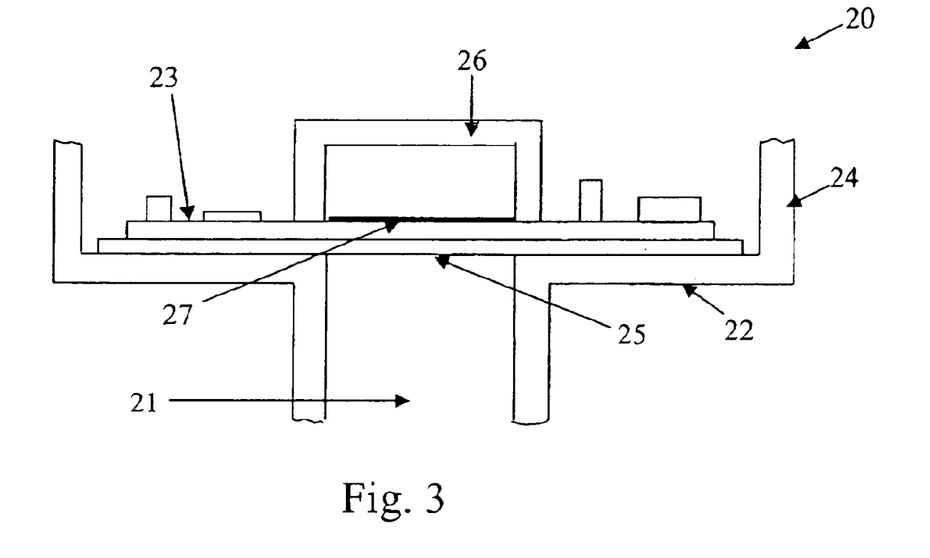
FIG. 3 schematically shows a dielectric barrier in a wave guide of a radar level gauge according to one aspect of the invention.

A preferred embodiment of the present invention is shown in FIG. 3, representing part of a cross section of a radar level gauge unit 20. In FIG. 3, 21 denotes antenna wave guide member which can be coupled to the antenna. In this embodiment the enclosure (shown partly) around the measurement circuitry 23 forms a unity together with the antenna wave guide member 21, which is provided with flanges 22 for facing and supporting the measurement circuitry 23, represented in FIG. 3 by a circuit board 23a. A mechanical enclosure 24 is normally protecting the measurement circuitry 23. Said enclosure 24 is partly removed for the sake of clarity.

The circuit board 23a containing electronic components of the radar level gauge is attached to the flanges 22 of the antenna wave guide member 21 by means of an intermediate dielectric barrier 25 according to the invention, in FIG. 3 formed as an insulation sheet. A metal cap 26 formed as an end piece for closing the wave guide in the direction off the antenna is arranged on the circuit board 23a. A micro strip 27 for transmitting microwaves in the direction of the wave guide is mounted on the circuit board 23a.

FIG. 3 is a possible arrangement according to the invention. The thick insulation layer 25, In this embodiment as a washer, is attached to the metallic support/protection-box (enclosure 24) by adhesive to form a longitudinal wave guide sealing and the printed circuit board 23a has a ground plane on its bottom (except for the wave guide opening) and a wave guide end piece formed as a metal cap 26 is attached on its top.

An alternative embodiment is to use a dielectric insulation sheet 25 rather than a washer to obtain both electrical insulation and longitudinal sealing for both protection during service and to stop leakage through the wave guide. Typically for the wave guide in the radar level-gauging application is that a sealing is needed at one or two locations along the wave guide to seal the tank and to protect or seal the electronic unit. A third kind of requirement for sealing is a seal for explosion protection used in one kind of Ex-protection. A sealing with, e.g. an O-ring, is normally provided between the dielectric barrier and the wave guide, as shown in one of the drawings and this is the case both for the dielectric barrier formed as an insulation sheet and an insulation washer.

Figure 4:
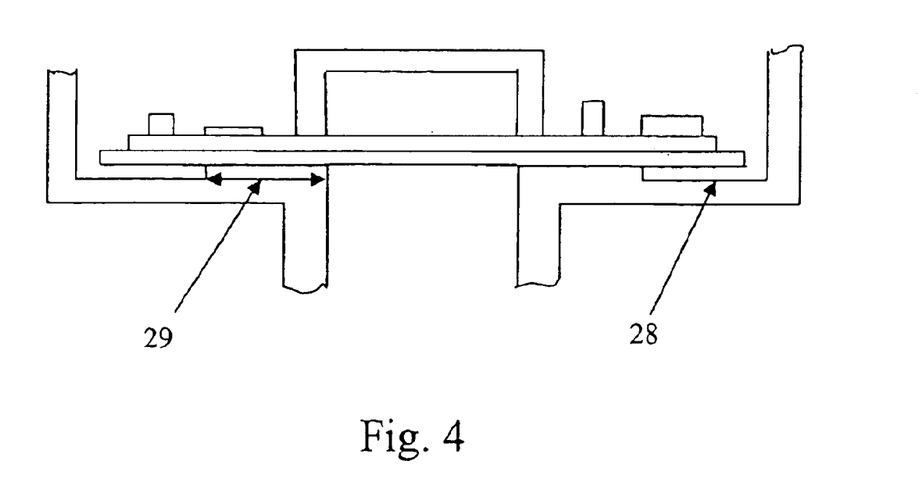
FIG. 4 shows another embodiment of the device in FIG. 3.

In FIG. 4 the bottom below the insulating sheet has got a recess 28 to form a quarter-wave (horizontal) path 29 through the insulating layer 25 in order to improve the electrical sealing. Depending on the exact measures the design according to FIG. 3 or 4 may be the optimal one.

Figure 5:
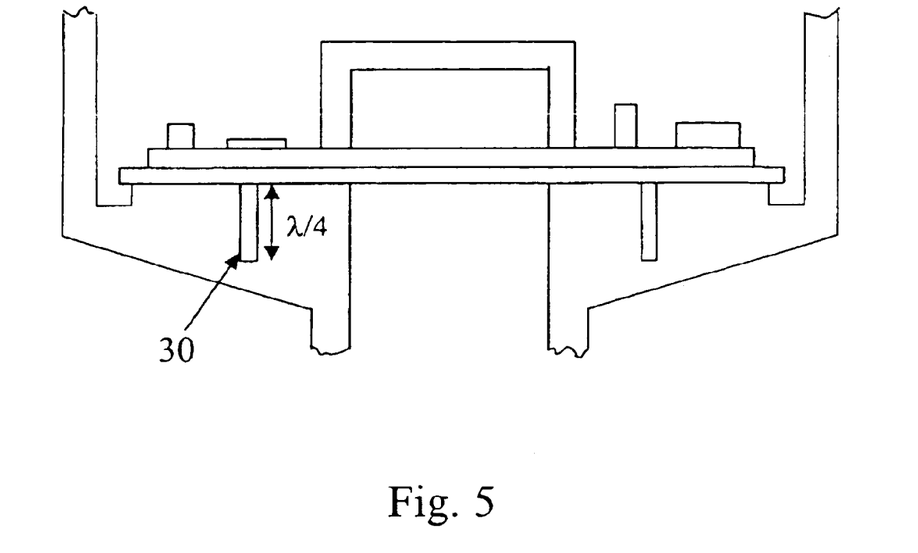
FIG. 5 shows a further embodiment of the device in FIG. 3.

A further method is indicated in FIG. 5 with a quarter-wave pocket 30 (also called quarterwave choke) located around the wave guide to combine radial electrical sealing with longitudinal mechanical sealing.

Additional features can be obtained by applying one or two quarter-wave pockets around the dielectric barrier or to add pattern in the sheet to obtain good electrical match in spite of a thick dielectric layer needed for meeting authority insulation requirements. Unless an insulation sheet is very thin (and thus probably not suited to fulfil formal insulation requirements) it will cause a very undesired distortion (reflection or VSWR) in the microwave propagation but by a suitable design such distortion can be arbitrarily reduced. Two or more cooperating distortions are one possibility known from other wave guide applications.

Figure 6:
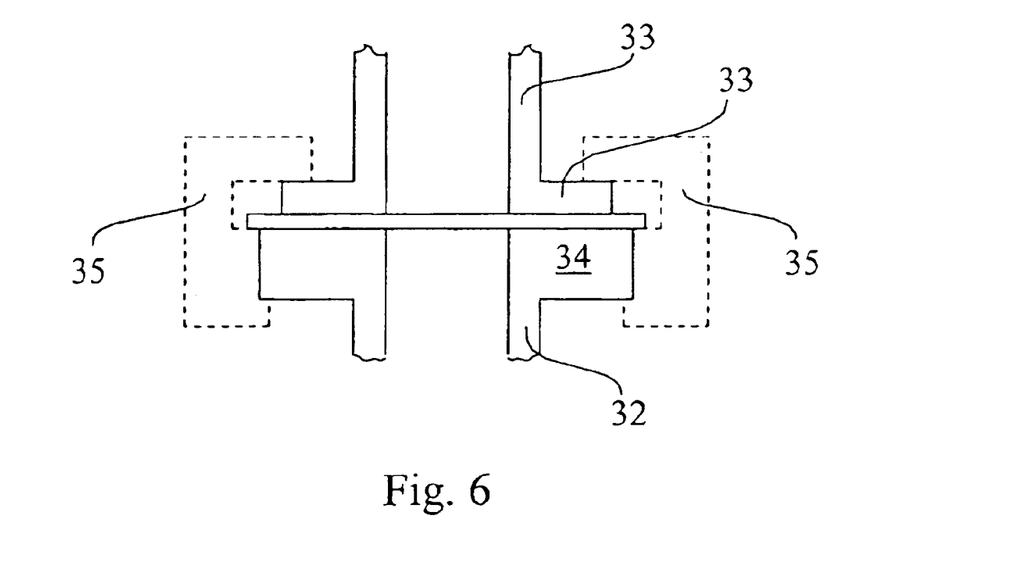
FIG. 6 shows a the dielectric barrier in a wave guide joint.

FIG. 6 shows the invention applied in a separable joint located where the electronic unit above is attached to a second wave guide member 31 and an antenna wave guide member 32 continuing to and attached to the antenna and said separable joint provided with the insulation sheet 25 between said antenna wave guide member and said second wave guide member and where said thick sealing and insulation sheet 25 is used both for radial electrical sealing and longitudinal mechanical (gas, liquid etc.) sealing.

The sealing (insulation) sheet 25 is located between the two wave guide flanges 33, 34 that are designed for electrical and (optional) mechanical sealing. A nut 35 made of insulating material (dotted) can be used for mechanical attachment. If another insulating washer is used a metal nut can be used. In a similar way as in FIGS. 4 and 5 a quarter wave pocket can be added for improved electrical function and (not shown) one or more O-ring seal can also be added.

The sealing (insulation) sheet 25 can be fitted with a conductive pattern giving a reflection in the wave guide, which counteracts with the reflection caused by the sheet 25 and thus improve the overall electrical match. Such a pattern can in terms of improved electrical match replace the quarter-wave pocket and enable a thicker sheet to be used.

Two common frequencies used for radar level gauging are in two bands in the vicinity of 6 GHz and 25 GHz. Especially for the high frequency the requirement for a 0.5 mm insulating layer implies that the design around the insulating layer must be well designed in order to avoid disturbances in the microwave function as the microwave wavelength in the Insulation material may be for instance 8 mm.

Figure 7:
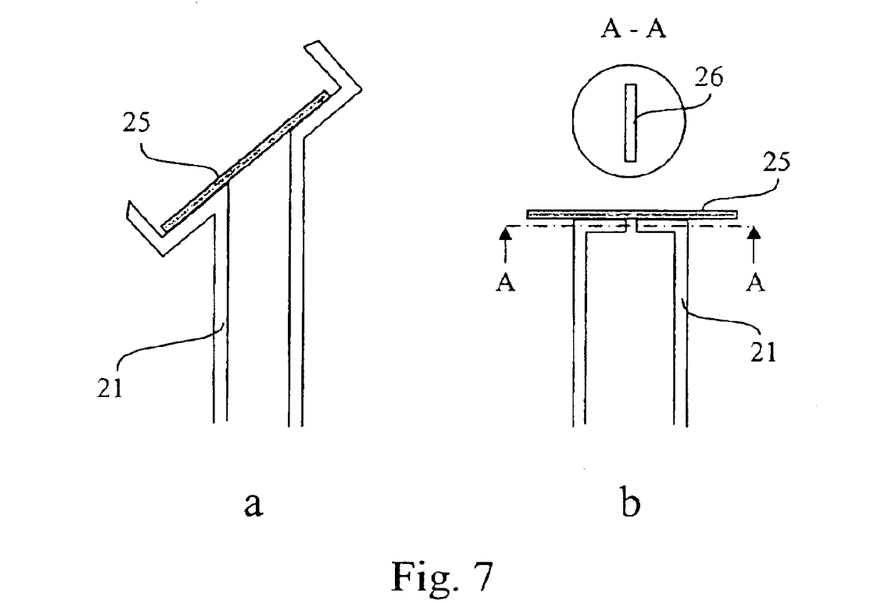
FIG. 7 shows some alternative embodiments of the opening of the antenna wave guide member.

Some alternative embodiments of the opening performed in the antenna wave guide member are shown in FIG. 7. FIG. 7a illustrates an opening where the plane of the opening intersects the wave guide in an angle different from 90 degrees, which can be an advantageous embodiment in cases where there is a risk of condensated liquid to accumulate below the dielectric barrier. In FIG. 7b the antenna wave guide member has a wall at the end with a slot 26 provided in said wall for feeding microwaves through the slot. The slot 26 forms a part of the wave guide having a smaller cross sectional area compared to the full size area of the remaining part of the antenna wave guide member 21. The insulation sheet 25 is arranged across the slot on the outer side of the end wall. An intersection along the line A—A is shown in plane view in the FIG. The wall can of course also in this case be inclined in relation to a wave guide axis. The dielectric barrier is arranged across the outside of said wall.

Figure 8:
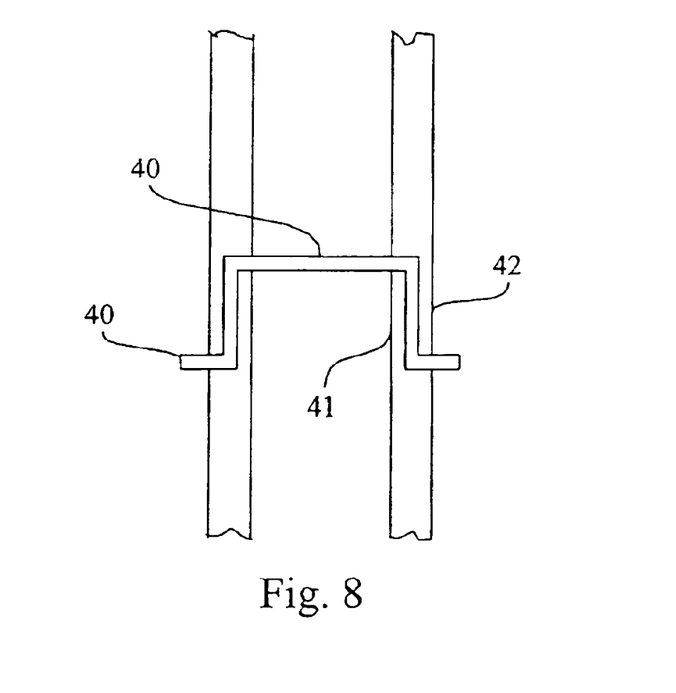
FIG. 8 shows a further embodiment of the shape of a dielectric barrier inserted in a wave guide joint.

FIG. 8 discloses a joint having a dielectric barrier 40 formed like a hat with its sides embedded inside longitudinal flanges 41 and 42 of the waveguide, flange 41 being a part of the antenna wave guide member and flange 42 being a part of the second wave guide member. The flat part of the hat, in this case, extends along the intersection of the wave guide as indicated above.

Figure 9:
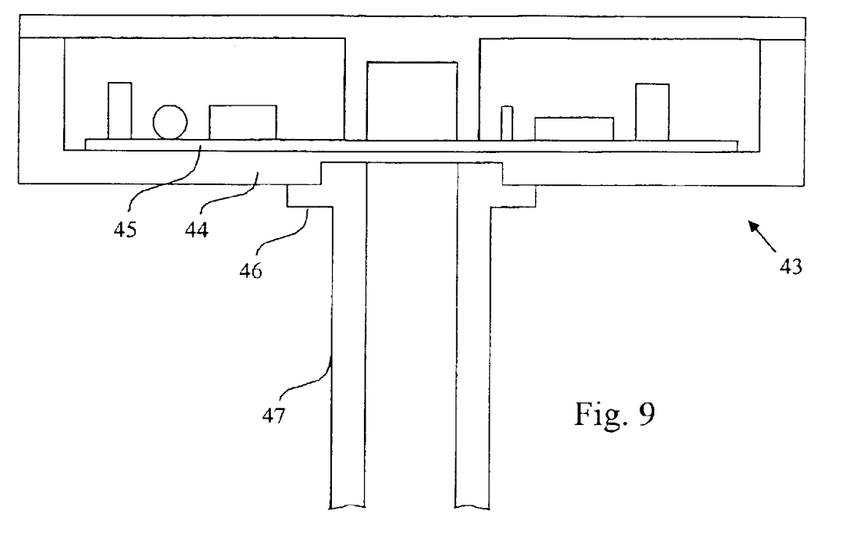
FIG. 9 illustrates an embodiment where a portion of a wall of the enclosure of the measurement circuitry functions as the dielectric barrier.

A further embodiment is shown in FIG. 9, where it is illustrated an enclosure 43 around the measurement circuitry. At least a part of the enclosure wall 44 constitutes the dielectric barrier, where this enclosure wall 44 is made of the dielectric material. A circuit board 45 Including components of the measurement circuitry Is mounted inside said enclosure wall 44. A supporting flange 46 is provided on the antenna wave guide member 47. The antenna wave guide portion around the flange 46 is provided with quarter wave chokes.

Figure 10:
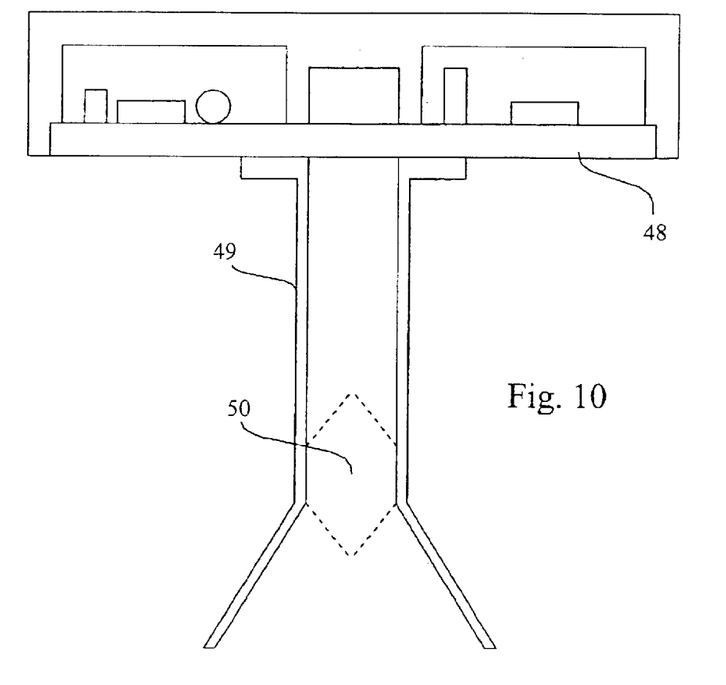
FIG. 10 illustrates an embodiment where the printed circuit board constitutes as the dielectric barrier.

Yet another embodiment of the invention is shown in FIG. 10, where the dielectric board 48 is formed as the dielectric barrier facing the antenna wave guide member 49. The dielectric board, in this case, performs both the function as an insulation layer and as a sealing against the wave guide member 49. The whole measurement circuitry including the insulation barrier may in this embodiment be accomplished on one circuit board. The circuit board may be performed as a multi layer board. The circuit board has of course no conductors penetrating the first side of the dielectric barrier (towards the antenna wave guide member). In FIG. 10 it is further illustrated an option describing an additional sealing against the tank 50 proivided inside the antenna wave guide member.

Still a further embodiment is disclosed in FIGS. 9 and 10, where it is indicated that a wave guide end piece is formed as an integrated part of the enclosure wall.

Figure 11:
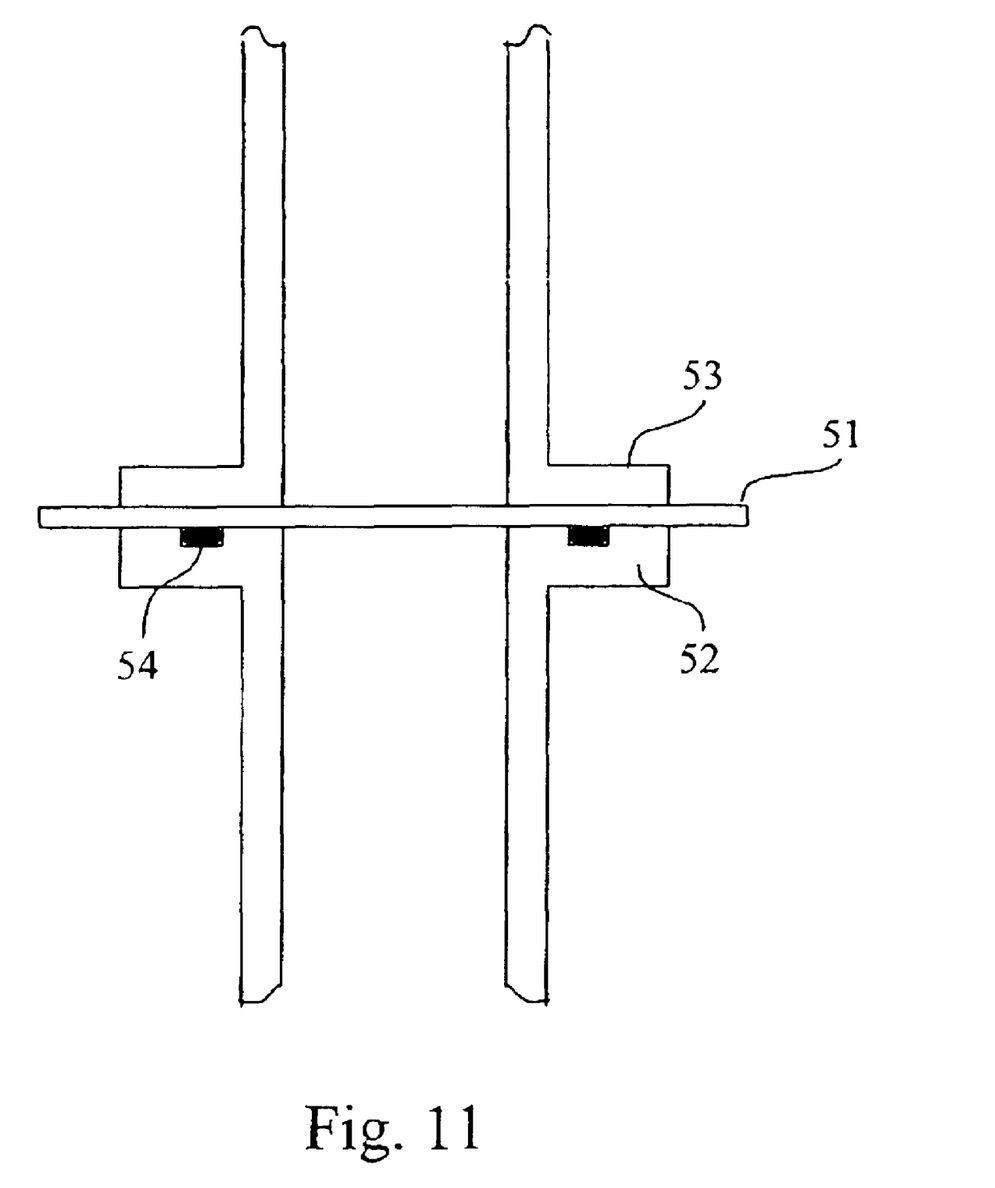
FIG. 11 shows an embodiment where a joint has a sealing between the insulation barrier and the antenna wave guide member.

FIG. 11 depicts an embodiment of a wave guide joint having flanges on both sides of the insulation sheet 51 for the support of said sheet. The numeral 52 denotes the flange of the antenna wave guide member and numeral 53 refers to the flange of the second wave guide member. In this figure it is also shown a sealing between the dielectric barrier 51 and the antenna wave guide member. Said sealing is in this example an O-ring, a sealing which could be used and provided in any of the embodiments earlier described.

What is claimed is:

1. A radar level gauge using microwaves for measuring a level of a surface of a product in a tank, comprising:
   an antenna for transmitting microwaves to the surface and receiving microwaves reflected by the surface,
   measurement circuitry feeding said antenna through a hollow wave guide, characterized in that the radar level gauge further includes:
   said hollow wave guide including at least an antenna wave guide member, at one end couplable to the antenna and at its other end having an opening in an intersection across the wave guide,
   a dielectric barrier extending along said intersection across the opening of said antenna wave guide member for non-conductively separating said antenna wave guide member from said measurement circuitry,
   said dielectric barrier having a first side facing the wave guide in a direction towards the antenna wave guide member, and
   said dielectric barrier having a second side facing a direction substantially away from the antenna wave guide member.

2. The radar level gauge according to claim 1, wherein said measurement circuitry comprises a microwave feeder for said feeding of the antenna and said feeder being arranged on said second side.

3. The radar level gauge according to claim 2, wherein said dielectric barrier includes a sheet of a solid dielectric material.

4. The radar level gauge according to claim 3, wherein said sheet is provided with one or more through holes.

5. The radar level gauge according to claim 3, wherein said insulation sheet provides both electrical insulation and a protection against longitudinal leakage of material through the wave guide, as said insulation sheet covers the whole area of said opening.

6. The radar level gauge according to claim 3, wherein said antenna wave guide member has a flange for supporting said insulation sheet.

7. The radar level gauge according to claim 3, wherein an enclosure housing said measurement circuitry has an outer wall constituting said insulation sheet.

8. The radar level gauge according to claim 3, wherein said insulation sheet on said second side is supported by a flange, which forms a part of an enclosure for the measurement circuitry.

9. The radar level gauge according to claim 1, wherein a wave guide end piece is arranged at said second side of the dielectric barrier adjacent to said dielectric barrier.

10. The radar level gauge according to claim 1, further comprising sealing means provided between the dielectric barrier and the antenna wave guide member to prevent leakage between an inside and an outside of the tank.

11. The radar level gauge according to claim 1, wherein the dielectric barrier includes a dielectric layer of a printed circuit board that forms a part of the measurement circuitry.

12. The radar level gauge according to claim 1, wherein the dielectric barrier has a smallest thickness equal to or greater then a predetermined value required to provide insulation to a given rated voltage.

13. The radar level gauge according to claim 1, wherein said predetermined value is 0.5 mm.

14. The radar level gauge according to claim 1, wherein, adjacent to the dielectric barrier, the antenna wave guide member by its shape and size forms a quarter wave sealing.

15. The radar level gauge according to claim 1, wherein, adjacent to the dielectric barrier, the antenna wave guide member is provided with at least one quarter-wave choke for the reduction of microwave leakage.

16. The radar level gauge according to claim 1, wherein said dielectric barrier on its second side has a conductive pattern over a part of the wave guide opening to improve an electric matching between the barrier and the wave guide.

17. The radar level gauge according to claim 1, wherein
   the wave guide is provided with a second wave guide member having a first end coupled to said measurement circuitry,
   said second wave guide member has a second end couplable to the opening of said antenna wave guide member to form a separable joint, and
   the dielectric barrier is arranged between the antenna wave guide member and the second wave guide member to provide said non-conductive separation.

18. The radar level gauge according to claim 1, wherein said antenna wave guide member has a wall extending along said intersection and that said opening is formed as a slot in said wall.

19. The radar level gauge according to claim 1, wherein said intersection is included in an intersectional plane.

20. A method for non-conductively separating a wave guide coupled to an antenna from a measurement circuitry of a radar level gauge for measuring the level of a surface of a product in a tank, the method comprising:
   transmitting microwaves to the surface and receiving microwaves reflected by the surface by means of an antenna,
   feeding the microwaves from said measurement circuitry to said antenna through a hollow wave guide, providing an antenna wave guide member at one end of the wave guide, the antenna wave guide member coupled to the antenna,
   providing the other end of the antenna wave guide member with an opening along an intersection of the antenna wave guide member,
   providing a dielectric barrier along said intersection across said opening of said antenna wave guide member,
   arranging said dielectric barrier to have a first side facing the wave guide in a direction towards the antenna wave guide member, and arranging said dielectric barrier to have a second side facing a direction substantially away from said antenna wave guide member.

21. The method of claim 20, further comprising:

providing a microwave feeder on said second side.

22. The method of claim 21, further comprising:

arranging a wave guide end piece on a side of said dielectric barrier with said end piece facing said second side of the dielectric barrier.

23. The method of claim 20, further comprising:

providing a sealing means between the dielectric barrier and the antenna wave guide member to prevent leakage between a inside and an outside of the tank.

24. The method of claim 20, further comprising:

providing the wave guide with a second wave guide member having a first end coupled to said measurement circuitry, coupling a second end of the said second wave guide member to the opening of said antenna wave guide member to form a separable joint, and arranging said dielectric barrier between the antenna wave guide member and the second wave guide member for acting as said non-conductive separation.

25. The method of claim 20, further comprising:

covering the whole opening of the antenna wave guide member with said dielectric barrier.

* * * * *